3,189,998
CUTTING BLADES FOR POWER-OPERATED KNIFE
James W. Beisheim, Spencerport, and Carl J. Stephens, Batavia, N.Y., assignors to General Electric Company, a corporation of New York
Filed July 29, 1963, Ser. No. 298,303
2 Claims. (Cl. 30—272)

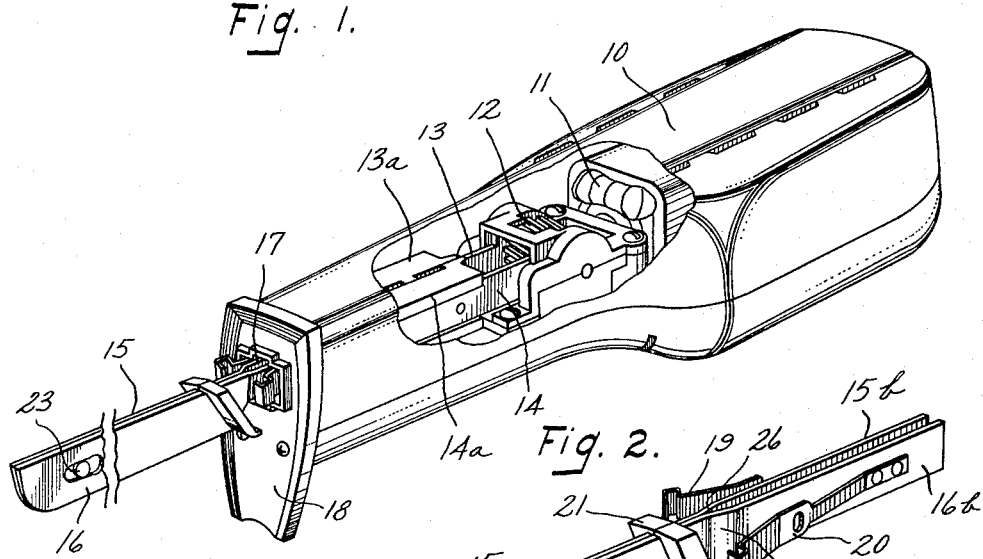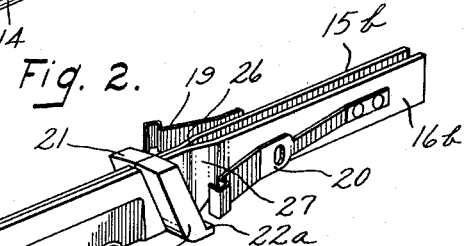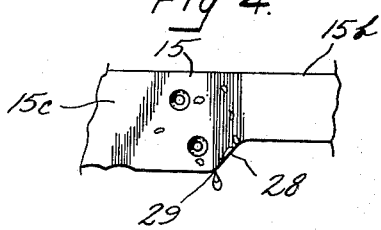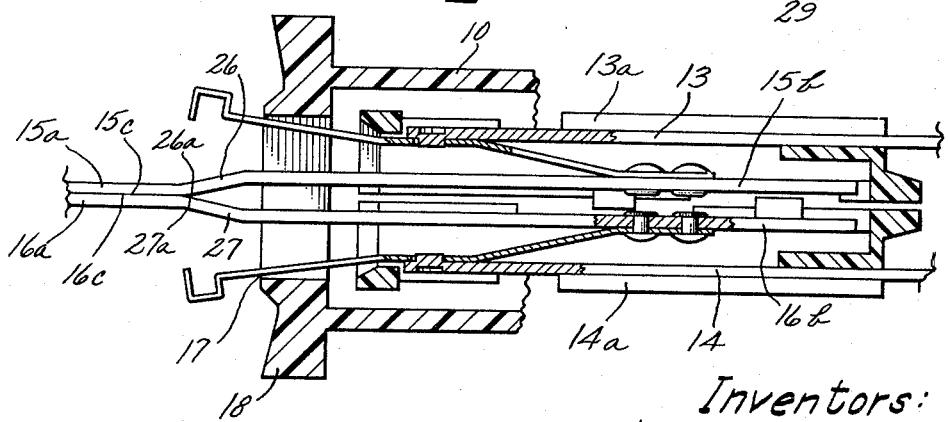
Inventors:
James W. Beisheim,
Carl J. Stephens
by Leonard J. Platt
Their Attorney

United States Patent Office 3,189,998
Patented June 22, 1965

This invention relates to cutting blades and in particular to such blades used in a power-operated knife.

It has been found that for the cutting of food stuffs, such as bread, vegetables and meat, a highly satisfactory cutting action is provided by a power-operated knife having a pair of relatively reciprocating blades in intimate sliding contact with one another. Such blade action, derived from a drive mechanism secured to the blades, achieves a shearing of the food material which substantially eliminates any physical effect from the slicing process. Although the intimate sliding contact and relative reciprocation of the blades provide a desirable cutting action, several problems may arise from such a design.

One of the problems which may be encountered by such dual blade, power-operated, knives is that the close contact of the blades permits the storage of food juices between the blades which spreads between the blades by capillary action and by the sliding action between the blades so that a portion of such food juices moves rearwardly between the contacting faces of the blades toward the drive mechanism. Thus the food juices flowing to the rearward end of the knife blades may enter the drive mechanism and interfere with the operation of the knife. Furthermore, where electrical means are used for the power operation of the knife, an unsafe condition may be created by the flow of liquid into the vicinity of the electrical components which may also be positioned rearwardly of the knife blades.

If the driving mechanism is enclosed in a housing, the entrance of food juices into the drive housing may also create odor and possible health problems due to the difficulty in cleaning of the housing interior.

Accordingly, it is a primary object of this invention to provide a power-operated slicing knife having a pair of relatively movable, intimately contacting, blades in which food juices cannot flow between the blades into the knife drive mechanism by capillarity.

In carrying out the objects of this invention in one form thereof, a power-operated slicing knife is provided having a drive mechanism, a pair of knife blades connected to the drive mechanism for relative reciprocal movement and means for holding the blades in sliding contact with one another. The blades each include a rearwardly extending tang portion adapted for connection to the drive mechanism and a forwardly extending cutting portion. To prevent the flow of food juices between the tang portions of the blades resulting from the sliding contact and/or capillary action, the tang portions are offset laterally from the cutting portions so as to be spaced from each other. Therefore, juices flowing between the forward cutting portions of the blades are not held between the adjacent surfaces of the tang portions of the blades.

As another feature of our invention means are provided on each knife blade between the cutting portion thereof and the drive mechanism to direct the flow of juices, which reach the spaced tangs, to a drip point. This causes the juices to drip from the blades, preventing travel of the juices to the drive mechanism via the lower edge of the tangs.

The drive mechanism is preferably housed within a casing into which the blade tangs extend for connection to the drive mechanism. Thus, in the preferred form the tangs of the blades extend forwardly from the housing so that the spacing of the tangs and the location of the drip point permit the juice moving rearwardly from between the cutting portions of the blades to fall from the blades prior to entrance into the housing.

Other objects and advantages of our invention may best be understood by reference to the following description taken in connection with the accompanying drawings in which:

FIG. 1 is a perspective view of one form of the invention having a portion of the knife housing cut away to reveal certain internal elements;

FIG. 2 is an enlarged perspective view of the knife blades shown in FIG. 1;

FIG. 3 is an enlarged plan view in partial section showing the blades of FIG. 2 secured to the knife drive mechanism, and a portion of the knife housing; and FIG. 4 is a partial side view of one of the knife blades shown in FIG. 2 having a deflector element removed for clarity.

Referring now to the drawings, FIG. 1 shows a power-operated slicing knife in accordance with one form of our invention having a handle housing 10 which encloses a rearwardly positioned electric motor 11, a geared power transmission 12 which converts the rotary motion of motor 11 to reciprocating motion, and a pair of connecting rods 13 and 14 which are driven by transmission 12 with counter-reciprocating motions. A pair of blade retainers 13a and 14a, secured to connecting rods 13 and 14 respectively, are adapted to receive a pair of knife blades 15 and 16 which extend into the forward portion of housing 10 (see FIG. 3) through an aperture 17 in the forward end or hilt 18 of the housing. Through this arrangement blades 15 and 16 may be driven in short counter-reciprocating strokes along an axis parallel to the longitudinal axis of housing 10.

Blades 15 and 16 include respective forward cutting portions 15a and 16a and integral rearward tang portions 15b and 16b, as may be seen in FIGS. 2 and 3. Latching means, such as resilient arms 19 and 20 secured to the rear of blades 15 and 16 respectively, permit the manual engagement and disengagement of the blades with the drive mechanism. Deflectors 21 and 22, which are secured to the outer surface of the blades, prevent food particles flowing along the outer surface of the blades from reaching aperture 17. The cutting portions 15a and 16a of the knife blades are held in intimate sliding relation along their inner surfaces by any suitable conventional means such as the slot and rivet arrangement 23. The sliding contact and counter-reciproated motion of the blades provide a shearing action between the scallops or serrations 24 formed on the bottom edge of each knife blade, and the outer faces of the blades are partially ground as shown at 25.

The inner contacting surfaces of cutting portions 15a and 16a, designated as 15c and 16c respectively, are substantially flat throughout their entire length being hollow ground .001–.002 inch. For ideal shearing action the flatness is held to a degree such that the maximum spacing between surfaces 15c and 16c is approximately .008 inch. Despite the intimate contacting relation between the inner surfaces or faces 15c and 16c, the normal use of the knife permits vegetable, fruit or meat juices from the food stuffs being sliced to enter the very minute spaces between surfaces 15c and 16c such as that created by the hollow grinding. It has been found that once liquids enter this interfacial area they will move by capillarity throughout the area. Of course a portion of such liquids then move rearwardly towards housing 10 between the inner faces 15c and 16c and would continue to travel by capillarity into the housing 10 through aperture 17 if blades 15 and 16 were in intimate contact throughout their entire length. During operation, the sliding contact of blades 15 and 16 increases the flow of liquids into the interfacial area between the blades so that a relatively steady flow of liquids is directed towards the housing from between the blades. However, even when the knife is not operating, liquids present in the interfacial area will spread rearwardly by capillary action.

To prevent the movement of liquids into the housing 10, tangs 15b and 16b of the knife blades are spaced from one another as shown in FIG. 3 from a point forward of aperture 17 rearwardly so that the capillary movement of liquids between the blades is terminated forward of housing 10.

The spacing of the knife blade tangs is accomplished by laterally offsetting the tang portions approximately one-half of the desired spacing by forming the blade tangs as shown at 26 and 27. A satisfactory spacing has resulted from an offsetting of each tang a distance approximately equal to the thickness of the blade. Therefore, the spacing between the tangs is approximately twice the thickness of one blade.

It is to be understood that while the blades are shown in FIG. 3 in their neutral position, i.e., the center of their stroke, the length of the stroke is such that, when each blade reaches its rearmost position, the forward ends 26a and 27a of offset portions 26 and 27 are still spaced forwardly of aperture 17. Thus, the liquids moving between the blades rearwardly, will flow downwardly along the inner surface of one of the offset portions by normal gravitational action, forward of aperture 17 as shown for blade 15 in FIG. 4.

However, the offset portions of the blades may not be spaced an undue distance from aperture 17 in that the offset length reduces the cutting portion of the blades by an equal length. Satisfactory results have been obtained by having the forward ends 26a and 27a spaced at least approximately 3/16 of an inch forward of aperture 17 when the blades are in their rearmost position. It should also be noted that, when the knife is in operation the capillary action between the blades is broken along a line where the forward end of the offset portion of the forwardmost blade reaches. In other words, the offset tangs inhibit capillary action between the blades at a line spaced one stroke length forward of the rearmost position of ends 26a and 27a.

Another unique feature of our invention prevents liquid, which reaches the offset portions of the blades, from entering the knife drive mechanism via the lower edges of the tangs once its capillary flow has been terminated. When the capillary liquid flow is terminated at the offset portions where the blades diverge, the liquid will, by gravity, flow downwardly to the lower edge of the blade. By stepping the lower edge 28 of the offset portions upwardly as best seen in FIG. 4, a drip point is provided at 29. As liquids reach edge 28 they gravitate forwardly along edges 28 until they drip from the blades at drip point 29 as shown in FIG. 4. Where deflectors such as 21 and 22 are used the liquid flowing downwardly on edges 28 drips from the rearward tang portions 22a.

FIG. 3 shows the extent to which tang portions 15b and 16b extend into housing 10, such that the rearward ends of the tangs are positioned adjacent the rearward ends of blade retainers 13a and 14a, just forward of transmission 12. This design is desirable to securely attach the blades to the drive mecahnism and it can be seen that liquids flowing between the blades could readily enter the transmission and motor area of the housing if the blades were in sliding contact throughout their entire length.

We have thus provided a power-operated slicing knife, having a pair of knife blades in intimate sliding contact, wherein the flow of liquid materials between the blades by capillarity is prevented from interfering with the motor or drive mechanism to create difficulties of operation, or safety hazards. Potential odor and health problems are also eliminated by preventing food juices from accumulating in the handle housing. It is to be understood that the particular construction described herein is by way of example only and it is the aim of the appended claims to cover all such equivalent variations as come within the true spirit and scope of the foregoing disclosure.

What is claimed as new and desired to be secured by the Letters Patent of the United States is:

1. A power-operated slicing knife comprising:
 (a) drive means including a pair of connecting elements adapted to be connected to a source of power for reciprocation of said elements;
 (b) a pair of integral knife blades, said blades being adapted for connection to said drive means;
 (c) each of said blades comprising:
  (aa) a rearwardly extending tang portion,
  (bb) a substantially flat forwardly extending cutting portion, the cutting portions of said blades being held in sliding contact with one another;
  (cc) an offset portion connecting said cutting portion and said tang portion so that said tang portion lies generally parallel to but laterally offset from said cutting portion.
  (dd) a lower edge on said cutting portion extending downwardly below a horizontal plane passing through the lower edge of said tang portion, and
  (ee) a lower edge on said offset portion inclined upwardly from said lower edge of said cutting portion to the lower edge of said tang portion so that liquids reaching the lower edge of said offset portion flow downwardly and forwardly to drip from the lower edge of said cutting portion thereby preventing the flow of liquid along the lower edge of said tang portion to said drive means.

2. In an electrically operated slicing knife having a housing, said housing having a given axis, a forward portion, and a rearward portion, means defining an opening in one end of said housing, an electric motor in said rearward portion adapted for connection to a source of power, and drive means in said forward portion of said housing connected to said motor, a pair of elongated cutting elements each comprising:
 (a) a straight rearward tang portion having a lower edge, said tang portion extending through said aperture and being connected to said drive means;
 (b) a straight forward cutting portion having an axis parallel to said given axis, a lower cutting edge, and a side face in intimate sliding contact with the side face of the other cutting element;
 (c) said tang portions being parallel to but offset from the axis of said cutting portions at a point forward of said aperture so that said tang portions are sufficiently spaced from one another to prevent the capillary movement of liquid between said tang portions into said housing; and
 (d) inclined means connecting said lower edge of said cutting portion to the lower edge of said tang portion for directing the flow of liquid reaching the rearmost portion of the cutting portion away from the lower edge of said tang portion.

References Cited by the Examiner

UNITED STATES PATENTS

| | | | |
|---|---|---|---|
| 2,168,703 | 8/39 | Dziedzic et al. | 30—173 |
| 2,275,180 | 3/42 | Holsclaw | 30—209 X |
| 2,435,863 | 2/48 | Wydro | 143—60 X |
| 2,534,001 | 12/50 | Couse. | |
| 2,781,578 | 2/57 | Cuilfoyle | 30—272 |

FOREIGN PATENTS 203,615 9/23 Great Britain.

WILLIAM FELDMAN, *Primary Examiner.*

MILTON S. MEHR, *Examiner.*